US011260589B2

(12) United States Patent
Townsend et al.

(10) Patent No.: US 11,260,589 B2
(45) Date of Patent: Mar. 1, 2022

(54) PRINT HEAD FOR REGOLITH-POLYMER MIXTURE AND ASSOCIATED FEEDSTOCK

(71) Applicant: Craig Technologies Aerospace Solutions, LLC, Merritt Island, FL (US)

(72) Inventors: Ivan Townsend, Kennedy Space Center, FL (US); Robert Mueller, Kennedy Space Center, FL (US); Nathan Gelino, Kennedy Space Center, FL (US); Jonathan Smith, Kennedy Space Center, FL (US); Matthew Nugent, Kennedy Space Center, FL (US); Andrew Nick, Kennedy Space Center, FL (US); Jason Schuler, Kennedy Space Center, FL (US); Bradley Buckles, Kennedy Space Center, FL (US)

(73) Assignee: Sidus Space, Inc., Merritt Island, FL (US)

( * ) Notice: Subject to any disclaimer, the term of this patent is extended or adjusted under 35 U.S.C. 154(b) by 217 days.

(21) Appl. No.: 16/656,743

(22) Filed: Oct. 18, 2019

(65) Prior Publication Data
US 2020/0122392 A1   Apr. 23, 2020

Related U.S. Application Data

(60) Provisional application No. 62/777,315, filed on Dec. 10, 2018, provisional application No. 62/756,904, (Continued)

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/329* (2017.08); (Continued)

(58) Field of Classification Search
CPC ... B29C 64/209; B29C 64/364; B29C 64/329; B29C 64/118; B29C 64/393; B33Y 30/00; B33Y 50/02
See application file for complete search history.

(56) References Cited

U.S. PATENT DOCUMENTS

| 2005/0196482 A1* | 9/2005 | Khoshnevis | E04G 21/0463 425/207 |
| 2014/0252668 A1* | 9/2014 | Austin | B28B 3/20 264/40.7 |
| 2016/0263822 A1* | 9/2016 | Boyd, IV | B32B 27/00 |

FOREIGN PATENT DOCUMENTS

FR             3085129 A1 *   2/2020   ........... B29C 64/209

* cited by examiner

*Primary Examiner* — Yung-Sheng M Tsui
*Assistant Examiner* — Melody Tsui
(74) *Attorney, Agent, or Firm* — Mark Malek; Widerman Malek, PL

(57) ABSTRACT

A three-dimensional print head apparatus including a securing mechanism, a hopper, a nozzle, a barrel, and a heating system. The securing mechanism is adapted to secure to a wrist joint of a robotic arm. The hopper is secured to the securing mechanism and has a cavity and a lower aperture. The nozzle has an upper aperture and a lower aperture. The barrel has an elongate, hollow member with a first end secured to the lower aperture of the hopper and a second end secured to the upper aperture of the nozzle. The heating system is positioned along the barrel.

17 Claims, 7 Drawing Sheets

Related U.S. Application Data filed on Nov. 7, 2018, provisional application No. 62/747,184, filed on Oct. 18, 2018.

(51) Int. Cl.
    *B29C 64/393*    (2017.01)
    *B33Y 50/02*     (2015.01)
    *B29C 64/329*    (2017.01)
    *B33Y 30/00*     (2015.01)
    *B29C 64/364*    (2017.01)

(52) U.S. Cl.
    CPC .......... *B29C 64/364* (2017.08); *B29C 64/393* (2017.08); *B33Y 30/00* (2014.12); *B33Y 50/02* (2014.12)

PRINT HEAD FOR REGOLITH-POLYMER MIXTURE AND ASSOCIATED FEEDSTOCK

RELATED APPLICATIONS

This application claims priority under 35 U.S.C. § 119(e) of U.S. Provisional Patent Application Ser. No. 62/777,315 filed on Dec. 10, 2018 and titled POLYMER CONCRETE WITH THERMOPLASTIC AS BINDER. This application also claims priority under 35 U.S.C. § 119(e) of U.S. Provisional Patent Application Ser. No. 62/756,904 filed on Nov. 7, 2018 and titled ADDITIVE MANUFACTURING PRINT HEAD FOR REGOLITH-POLYMER MIXTURES. This application also claims priority under 35 U.S.C. § 119(e) of U.S. Provisional Patent Application Ser. No. 62/747,184 filed on Oct. 18, 2018 and titled CONCRETE PELLET FEEDSTOCK FOR 3-D AUTOMATED ADDITIVE CONSTRUCTION. The contents of these applications are incorporated herein by reference.

GOVERNMENT INTEREST

The invention described herein was made in the performance of work under a NASA contract NNK11EA08C and by employees of the United States Government and is subject to the provisions of Public Law 96-517 (35 U.S.C. § 202) and may be manufactured and used by or for the Government for governmental purposes without the payment of any royalties thereon or therefore.

FIELD OF THE INVENTION

The present invention relates to systems and methods for additive manufacturing. Specifically, the present invention is related to a 3D print head mechanism that can be attached to a robotic positioning device for three-dimensional automated additive construction.

BACKGROUND OF THE INVENTION

Prior art methods of construction use sulfur-based concretes as building materials. Sulfur is not available on the Moon in large quantities. In-situ resource utilization (ISRU) is an essential technology to accomplish putting humans on the Moon or Mars for extended durations. Therefore, there exists a need for an apparatus utilizing in-situ resources to construct structures on the Moon or Mars.

Portland cement concrete is the standard material for construction on Earth with over one hundred years of history promoting public trust. A large-scale 3D printer may be utilized to print using Portland cement concrete as the printing medium. While a printing operation using Portland cement concrete is feasible, there is a lot of preparation and cleanup work associated with using Portland cement concrete as the printing medium. In addition, using Portland cement concrete, the rheology is critical at a nozzle extrusion point and materials composition and mixing is also critical to achieving a successful print bead. Many in the construction industry have expressed a preference to use Portland cement concrete because it can be purchased locally almost anywhere in the world, thereby simplifying logistics when building structures globally. There exists a need for a printing medium and apparatus that promotes consumer confidence and produces a stronger product using a less complicated 3D printing method for construction of large structures such as habitats.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a three-dimensional print head apparatus including a securing mechanism, a hopper, a nozzle, a barrel, and a heating system. The securing mechanism is adapted to secure to a wrist joint of a robotic arm. The hopper is secured to the securing mechanism and has a cavity and a lower aperture. The nozzle has an upper aperture and a lower aperture. The barrel has an elongate, hollow member with a first end secured to the lower aperture of the hopper and a second end secured to the upper aperture of the nozzle. The heating system is positioned along the barrel.

The heating system includes a heater in thermal communication with the barrel, a thermocouple in thermal communication with the barrel, an insulator located on an external side of the barrel, and a heating controller in electronic communication with the heater and the thermocouple. The heating controller activates the heater dependent upon an input signal received from the thermocouple.

The hopper further includes an upper hopper plate configured to carry the securing mechanism, a conical body having an upper aperture with a diameter greater than a diameter of the lower aperture. The conical body of the hopper tapers from the upper aperture to the lower aperture. The upper hopper plate secures to and occludes the upper aperture of the conical body.

The upper hopper plate further includes a filter carrying aperture formed through a thickness of the upper hopper plate and adapted to carry an air filter and a sealable aperture formed through a thickness of the upper hopper plate and adapted to be in a sealed or an unsealed configuration.

The barrel further includes a small cone, an upper flange, and a pipe. The small cone has a sidewall, an upper aperture, and a lower aperture. The upper aperture of the small cone has a diameter greater than a diameter of the lower aperture of the small cone and the sidewall tapers from the upper aperture to the lower aperture. The upper flange is secured to the small cone proximate the upper aperture of the small cone. The pipe has a first end and an opposing second end secured proximate the lower aperture of the small cone.

The hopper further includes a lower flange secured proximate the lower aperture of the hopper and configured to secure to the upper flange of the barrel.

The print head apparatus further includes a feed screw, a drive shaft, and a motor. The feed screw is positioned in an interior of the elongate, hollow member of the barrel and the drive shaft is adapted to transmit torque to the feed screw. The motor is adapted to provide torque to the drive shaft.

The print head apparatus still further includes a motor controller adapted to control the torque provided by the motor and a ball bearing housing carried by the hopper and surrounding the drive shaft. An angular contact ball bearing may be carried by the ball bearing housing and in contact with the drive shaft.

An agitator may be secured to the drive shaft and include an agitator flange, an upright member, a lateral member, and a paddle. The agitator flange is secured to a flange of the drive shaft. The upright member is secured at a first end to the agitator flange and extends from the agitator flange toward the nozzle. The lateral member has a first end secured to a second end of the upright member and extends orthogonally from the upright member toward a conical body of the hopper. The paddle secures to a second end of the lateral member and is positioned parallel to an interior surface of the conical body of the hopper.

The nozzle includes a tube defining a cavity and having an open end and an occluded end. The open end of the nozzle defines the upper aperture of the nozzle. The lower aperture of the nozzle is located in the occluded end of the tube.

The nozzle further includes a threaded portion located proximate the open end of the tube and adapted to secure to the second end of the barrel.

The print head mechanism may further include a plate secured to the nozzle and at least a single flexible tube having an open end secured to the plate.

The print head mechanism may include a fume extraction system including a plate, a plurality of tubes, a manifold, and an exhaust tube. The plate is secured to the nozzle. Each of the plurality of tubes has a first open end secured to the plate. The manifold carries a second open end of each of the plurality of tubes. The exhaust tube has a first open end secured to the manifold and in fluid communication with the second open ends of each of the plurality of tubes.

The fume extraction system may further include a bracket, a cooling fan, a duct boost fan, and a bolt hole pattern. The bracket is adapted to secure to the plate and carry each of the first open ends of the plurality of tubes. The cooling fan is secured to the plate and in fluid communication with the lower aperture of the nozzle. The duct boost fan is secured to at least one of the plurality of tubes and in fluid communication with an interior volume of at least one of the plurality of tubes. The bolt hole pattern is positioned on the bracket to align with a second bolt hole pattern positioned on the plate.

The print head apparatus may further include a robotic arm and a wrist joint cooperatively configured to position the lower aperture of the nozzle with two degrees of freedom.

The print head apparatus may further include the robotic arm and the wrist joint cooperatively configured to position the lower aperture of the nozzle with three degrees of freedom.

DETAILED DESCRIPTION OF THE INVENTION

Figure 1:
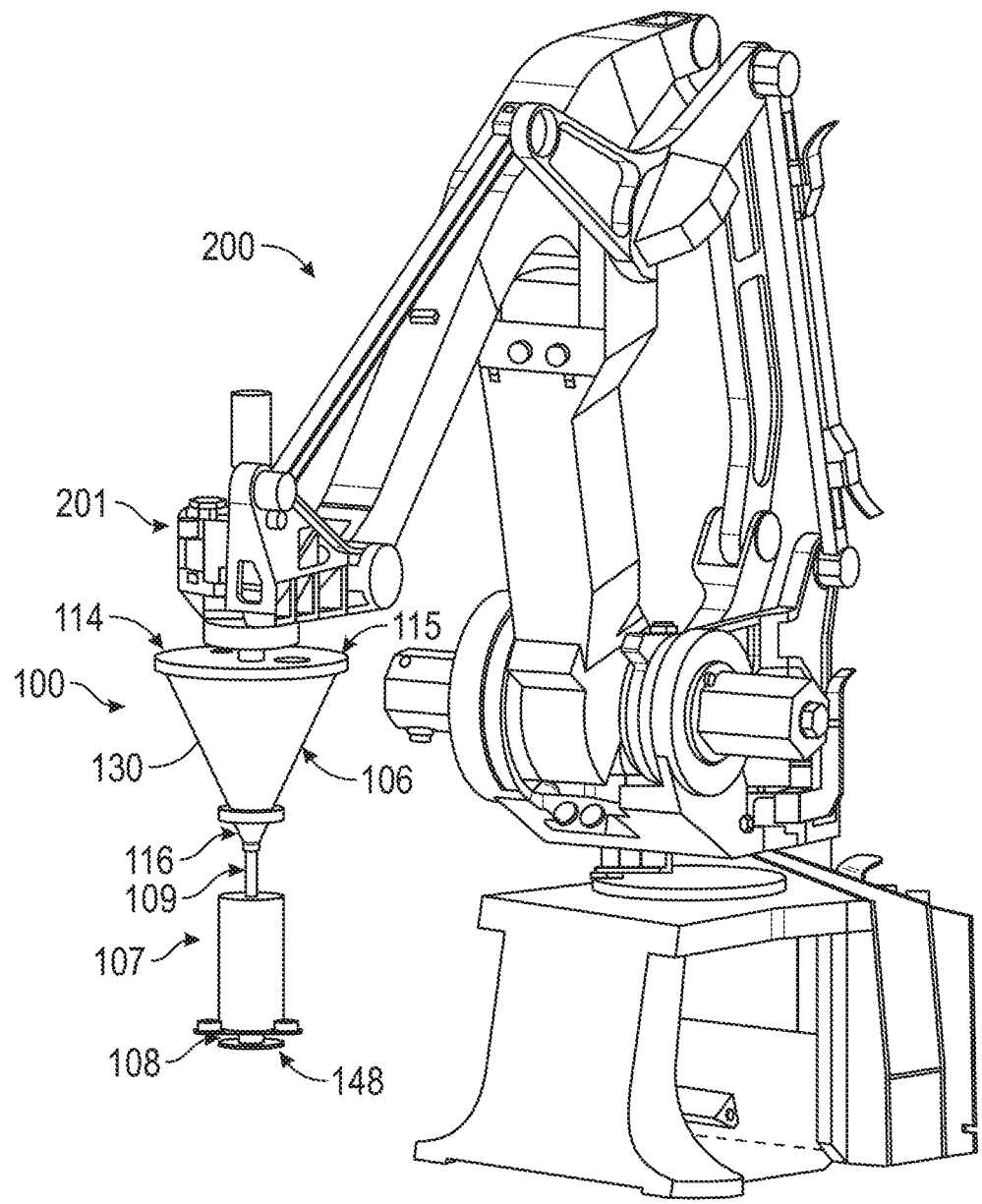
FIG. 1 is an environmental view of the 3D print head mechanism in combination with a robotic arm.
Figure 2:
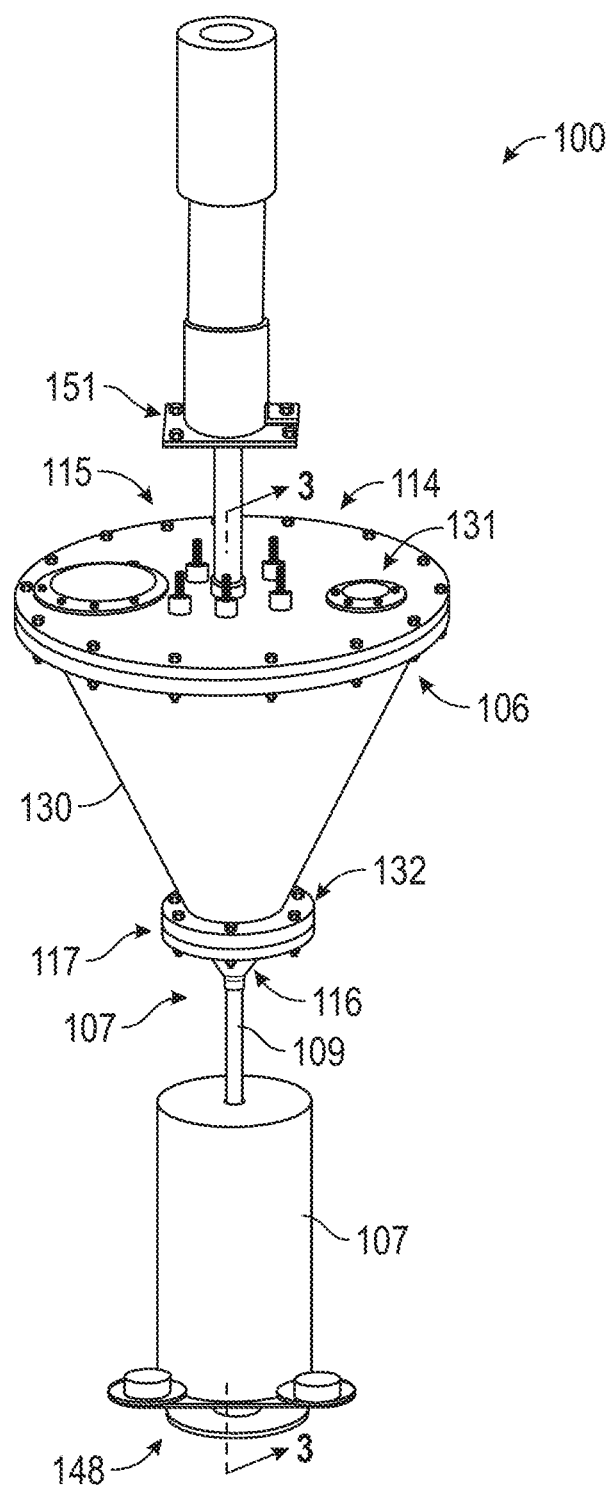
FIG. 2 is a perspective view of the 3D print head mechanism of FIG. 1.
Figure 3:
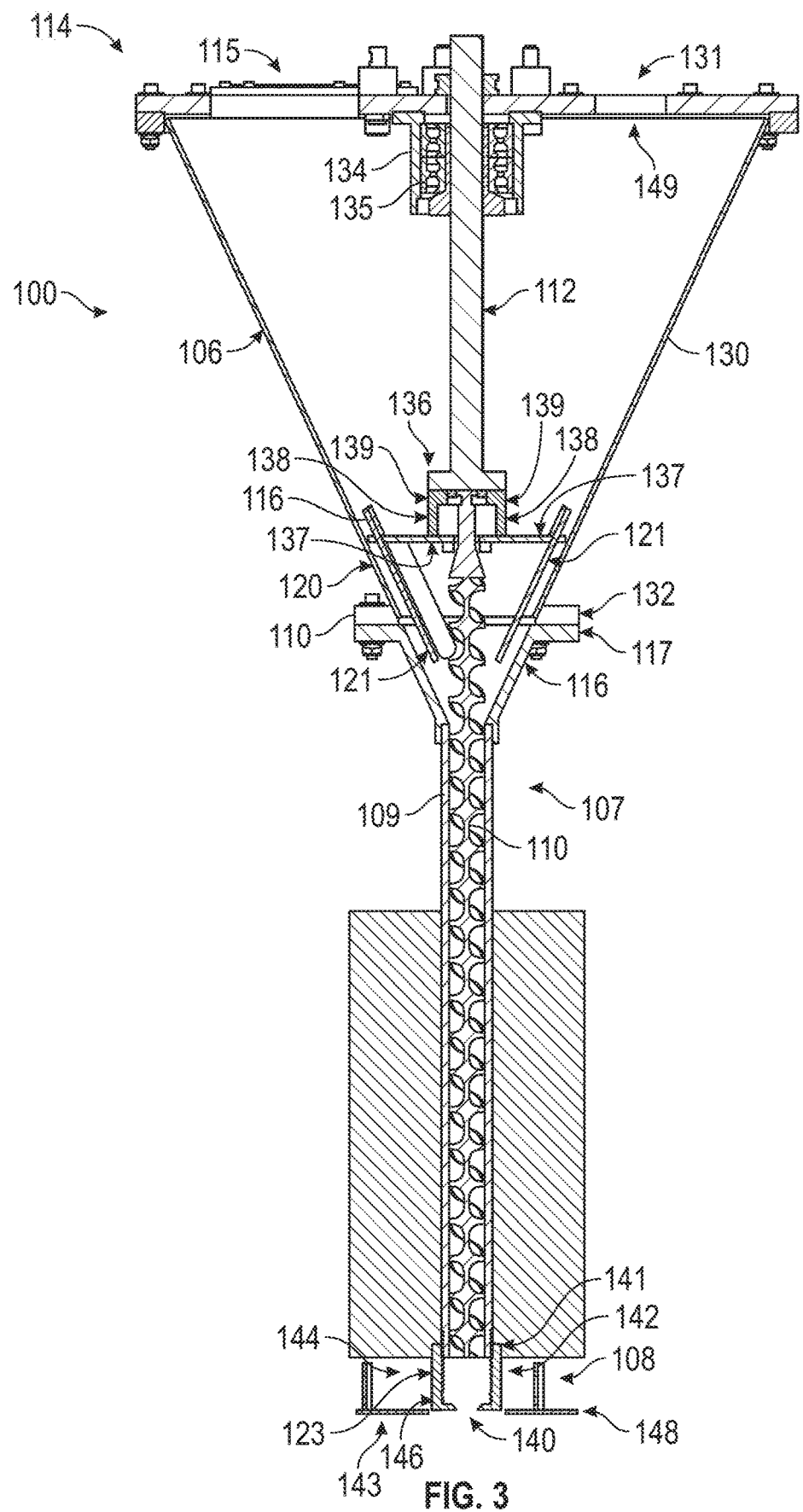
FIG. 3 is a cross section of the 3D print head mechanism taken through line 3-3 of FIG. 2.
Figure 4:
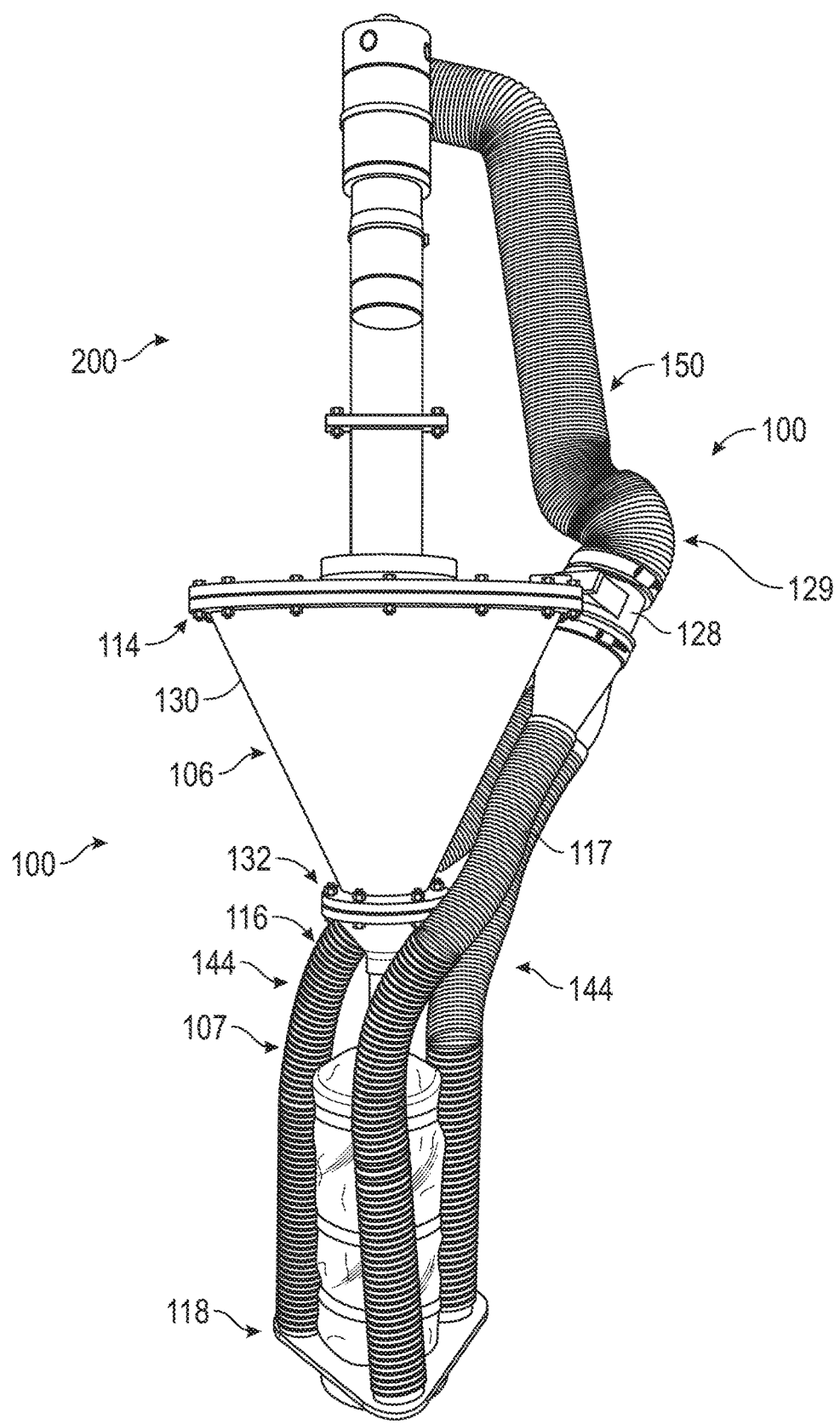
FIG. 4 is another perspective view of the 3D print head mechanism of FIG. 1.
Figure 5:
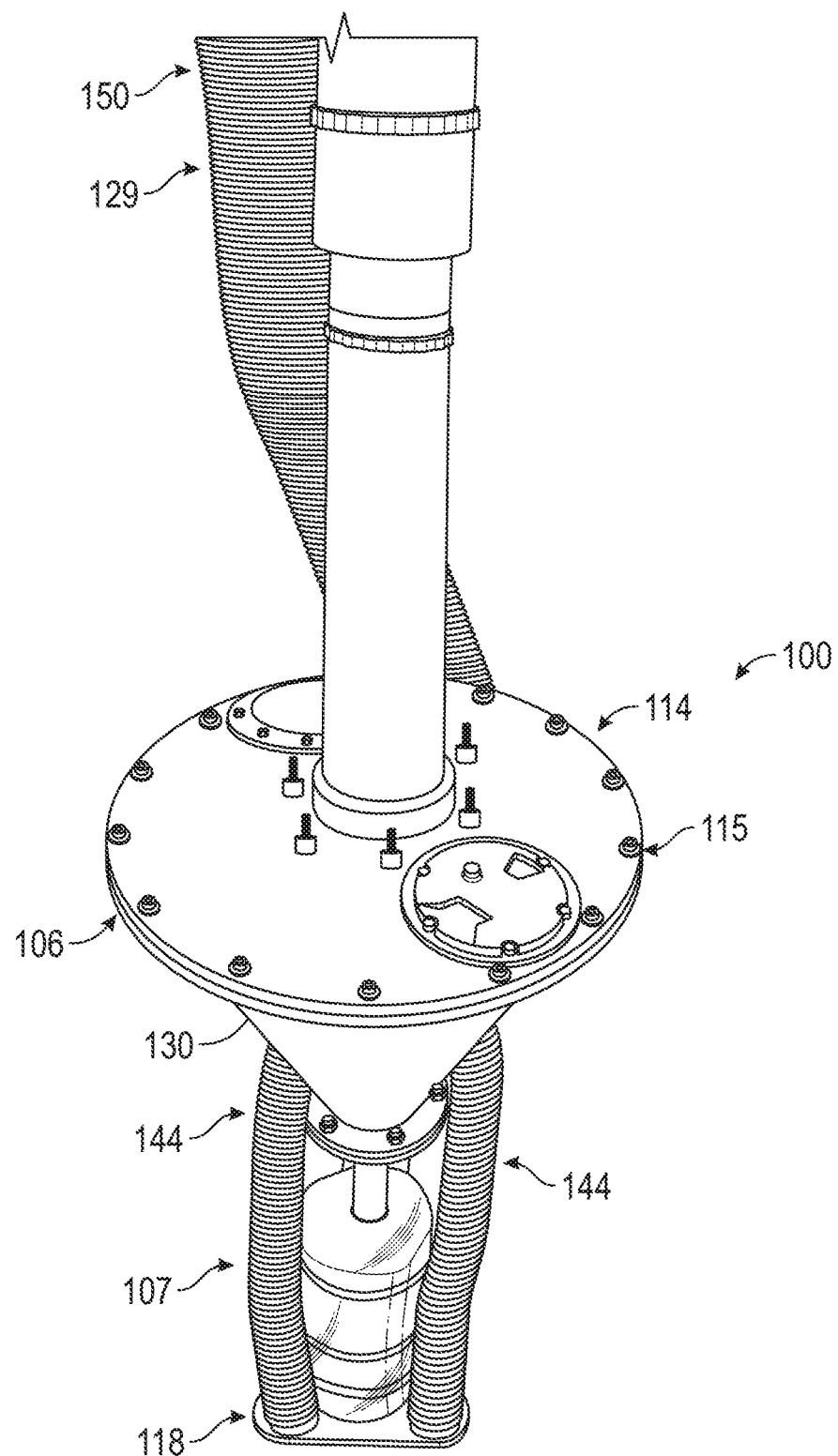
FIG. 5 is a top perspective view of the 3D print head mechanism of FIG. 1.
Figure 6:
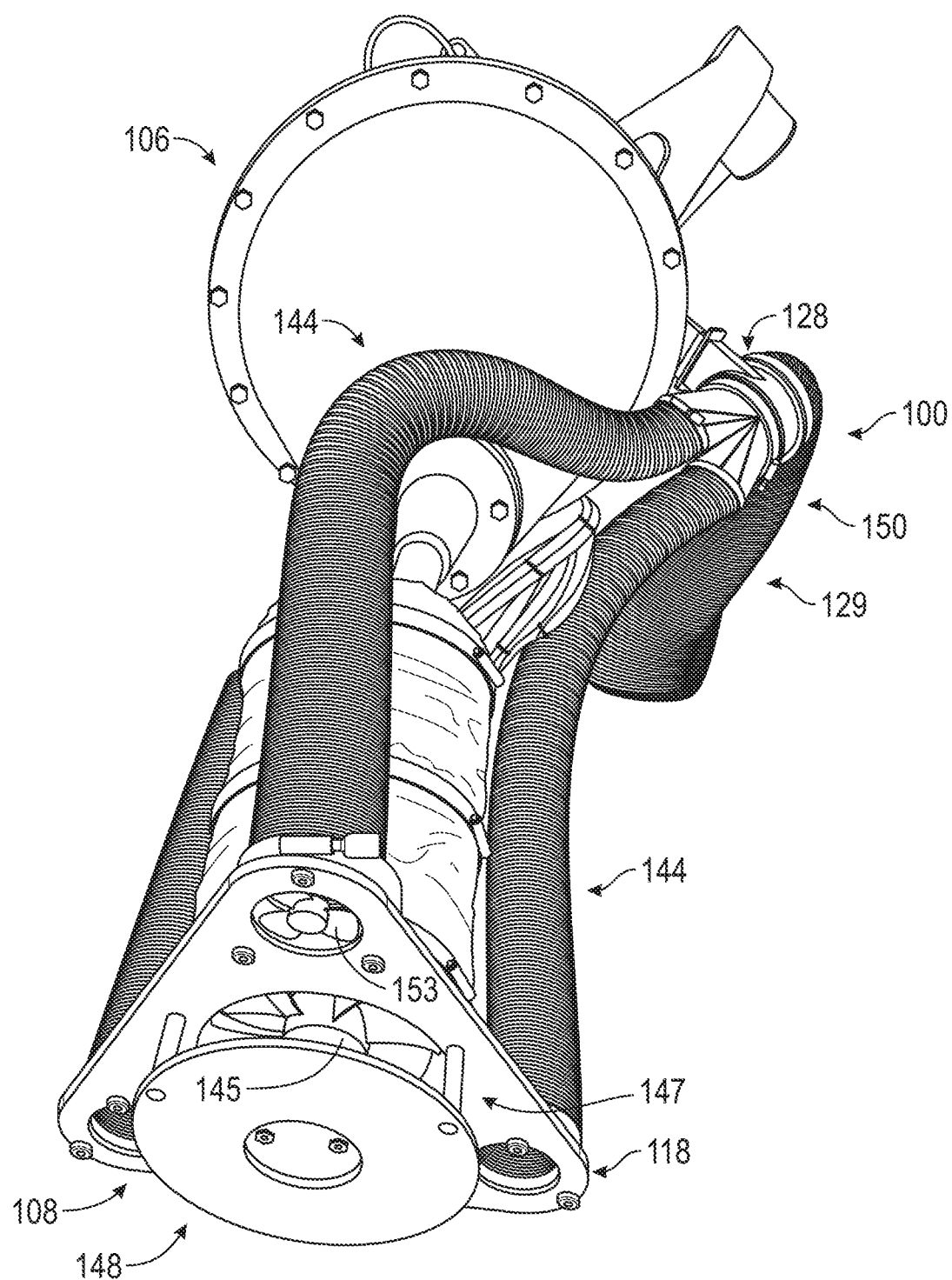
FIG. 6 is a bottom perspective view of the 3D print head mechanism of FIG. 1.
Figure 7:
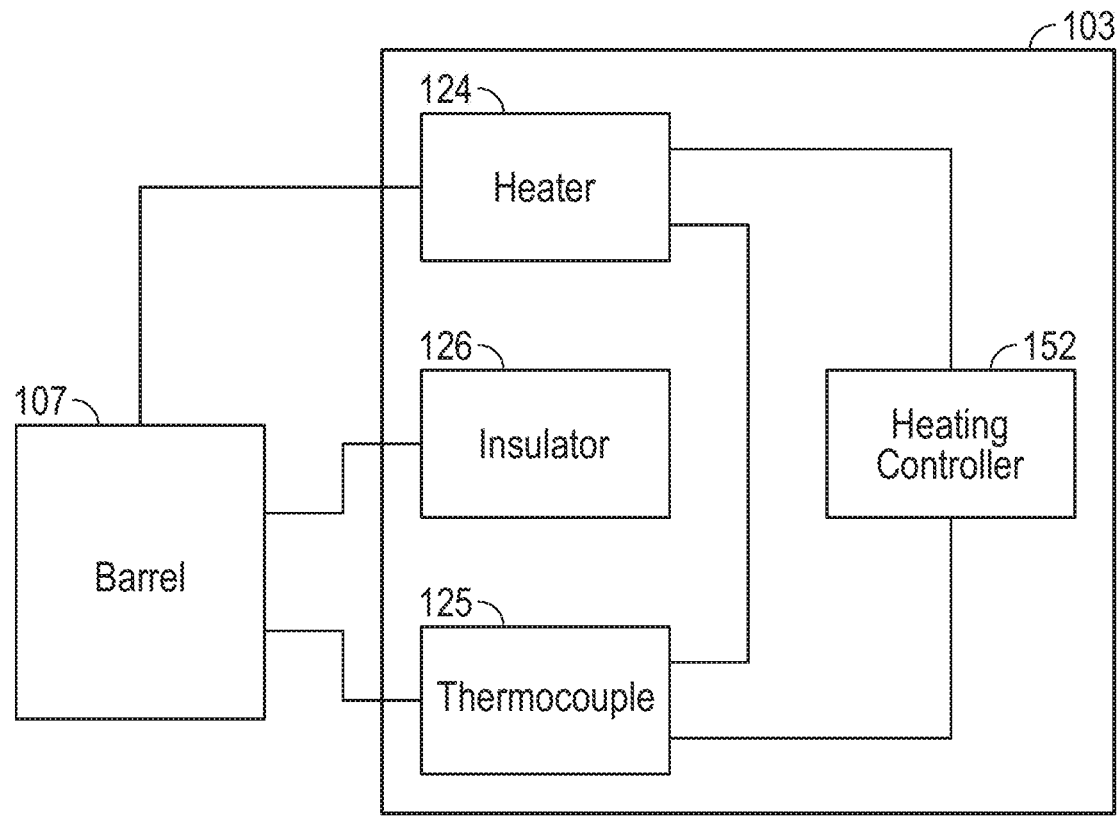
FIG. 7 is a block diagram of the heating system of the 3D print head mechanism of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides an apparatus for three-dimensional (3D) automated additive construction, which is also referred to as 3D printing with concrete, mortar, basalt, or other rock based composite types of materials. Specifically, a 3D print head mechanism 100 that can be attached to a robotic positioning device such as a robotic arm 200, which may have a wrist joint 201, or a gantry system is disclosed.

The 3D print head mechanism 100 heats and extrudes a regolith-polymer mixture as part of an additive manufacturing process. The process is intended to use in-situ resources on the Moon or Mars as raw materials for large scale construction projects including, but not limited to, habitats, radiation shields, berms, walls, paved surfaces, or the like. The 3D print head mechanism 100 may be mounted to a large robotic arm 200, which, alone or in combination with a wrist joint 201, may be the positioning device for the 3D print head mechanism 100.

The 3D print head mechanism 100 in combination with the robotic arm 200 and optional wrist joint 201 may provide an autonomous method of construction on the Moon, Mars, or other celestial body using local resources. This approach may advantageously minimize launch mass of construction materials and reduce human involvement with construction activities.

Additive construction technology using in-situ materials from planetary surfaces may reduce launch mass, allow structures to be three dimensionally printed on demand, and may allow building designs to be transmitted digitally from Earth and printed in space. This may ultimately lead to elimination of reliance on structural materials launched from Earth.

The 3D print head mechanism 100 may hold and extrude a regolith and polymer mixture in a fused deposition modeling additive manufacturing process. The regolith and polymer mixture, or other print media, may be placed in a hopper 106 through a sealable aperture 115, which provides access to a volume within the hopper 106. After being placed in the hopper 106, the print media may travel out of the hopper 106 through a lower aperture and along a heated barrel 107 to be extruded through an opening 140 in a nozzle 108. The robotic arm 200 or wrist joint 201 may position the opening 140 of the nozzle 108 to deposit the print media in a desired location or orientation. The robotic arm 200 or wrist joint 201 may dynamically reposition the opening 140 of the nozzle 108 throughout the printing process to construct the desired design.

The 3D print head mechanism 100 may by carried by a robotic arm 200, alone or in combination with a wrist joint 201, which may cooperatively provide two, three, or more degrees of freedom. The potential degrees of freedom may include movement along the X, Y, and Z axes and rotation about the X, Y, and Z axes. The robotic arm 200 may be secured to a wrist joint 201, which may be cooperatively configured with the robotic arm 200 to position a lower aperture, or opening 140, of the nozzle 108 with two, three, or more degrees of freedom. In some embodiments, the robotic arm 200 may provide lateral movement while the wrist joint 201 may provide rotation. The movement of the robotic arm 200 may position the 3D print head mechanism 100 around the print volume. The 3D print head mechanism 100 may include a securing mechanism 151, a feeding and conveying system, a heating system, a fume extraction system, and a dry air purge system.

The feeding and conveying system may include a hopper 106, a barrel 107, a nozzle 108, a motor, a transmission, and an agitator 120 and may be designed to move raw materials from the hopper 106, through the heating zone of the barrel 107, and out of the nozzle 108.

The securing mechanism 151 may secure to a wrist joint 201 of a robotic arm 200 or to a robotic arm 200 directly. The securing mechanism 151 may also secure to the hopper 106. The securing mechanism 151 may be a mounting plate or other mounting hardware providing a rigid connection between the 3D print head mechanism 100 and the robot moving the 3D print head mechanism. In one embodiment, the securing mechanism 151 may be an elongate structure to which the robotic arm 200 or wrist joint 201 may be clamped. More specifically, any structure to which the wrist joint 201 or the robotic arm 200 may be secured may be the securing mechanism 151.

The hopper 106 may store the raw materials and be configured to supply the raw materials to the barrel 107, which may then provide the raw material to the nozzle 108, through which they may extruded.

The hopper 106 may include an upper hopper plate 114, which may carry the securing mechanism 151 and secure to the robotic arm 200. By way of example, and not as a limitation, the upper hopper plate 114, may be secured to the robotic arm with one or more bolts, clamps, welds, or the like. In one embodiment, the upper hopper plate may secure to the wrist joint 201 of the robotic arm 200 or to the robotic arm 200 using a securing mechanism 151. The upper hopper plate 114 may have a sealable access port, or aperture, 115 and a filter carrying aperture 131. The sealable aperture 115 may be formed through a thickness of the upper hopper plate 114 and adapted to be in a sealed or unsealed configuration. The sealable aperture may be in the unsealed configuration to introduce raw materials to the hopper 106 and in the sealed configuration to retain the raw materials within the hopper 106. In one embodiment, the sealable aperture 115 may be secured, or sealed, in a closed configuration while the 3D print head mechanism is in use. The filter carrying aperture 131 may be formed through an entirety of the thickness of the upper hopper plate 114 and configured to carry an air filter. The air filter may be removable and replaceable. In one embodiment, the air filter may be a HEPA filter.

The hopper 106 may include a hollow conical body 130. The hollow conical body 130 may be adapted to carry or store the print media. By way of example, and not as a limitation, the hollow conical body 130 may be secured to the upper hopper plate 114 with one or more bolts, or the like. The conical body 130 of the hopper 106 may have an upper aperture, which may be covered, or occluded, by the upper hopper plate 114. The upper aperture may have a diameter greater than a diameter of a lower aperture of the conical body 130. Walls of the conical body 130 may taper from the upper aperture to the lower aperture. The conical body 130 may taper at a constant slope. In one embodiment, the conical body 130 may have a 65-degree slope angle defining an interior cavity which decreases in diameter from an upper portion of the hopper 106 to a lower portion of the hopper 106. The slope angle of the interior cavity may be greater than the angle of repose for the primary raw material of the print media and may be configured to assist in promoting the movement of print media from the upper portion of the hopper 106 to the lower portion of the hopper 106. The upper hopper plate 114 may have a sealable access port 115 which may be unsealed, or opened, to access a cavity of the hopper 106. Print media may be introduced to the hopper 106 through the sealable aperture 115. The sealable aperture 115 may be sealed, or closed, to retain print media within the cavity of the hopper 106 and prevent print media from entering or exiting the upper aperture of the hopper 106.

The lower portion of the conical body 130 may have a lower flange 132 extending outwardly from an exterior surface of the conical body. The lower flange 132 may surround a lower aperture of the hopper 106, which provides a passageway into the interior of the barrel 107. The lower flange 132 may secure to an upper portion of the barrel 107. In one embodiment, by way of example, and not as a limitation, the lower flange 132 may secure to an upper flange 117 of the barrel 107 using a plurality of bolts or the like.

A first end of the barrel 107 may be secured to the lower aperture of the hopper 106 and a second, opposing end of the barrel 107 may be secured to an upper aperture of the nozzle 108.

The barrel 107 may include a small cone 116 and an upper flange 117, which may be located at an upper portion of the barrel 107. The upper flange 117 may be located above the small cone 116, may extend outwardly from an exterior surface of the barrel 107, and may secure to a lower portion of the hopper 106. In one embodiment, the upper flange 117 may secure to the hopper 106 using a plurality of bolts or the like. In one embodiment, the lower flange 132 of the hopper 106 may secure to the upper flange 117 of the barrel 107 with a plurality of bolts. Both the lower flange 132 of the hopper 106 and the upper flange 117 of the barrel 107 may include a hole pattern. Each respective hole pattern may be configured to align with the other hole pattern when the hopper 106 is placed adjacent the barrel 107. Such a cooperative design may allow the hopper 106 to be secured to the barrel 107 by inserting a fastener through the aligned hole patterns.

The small cone 116 of the barrel 107 may be located beneath the upper flange 117 or may have the upper flange 117 secured to an upper, exterior surface. The small cone 116 may have an interior cavity defined by a sidewall tapering from a larger diameter at a top portion of the small cone 116 to a smaller diameter at a bottom portion of the small cone 116. The small cone 116 may have an upper aperture at a top portion of the small cone 116. The upper aperture has a diameter greater than a diameter of a lower aperture located at a bottom portion of the small cone 116. The diameter of the small cone 116 may taper from the upper aperture to the lower aperture. The interior surface of the small cone 116 may have a slope angle equal to the slope angle of the hopper 106. The upper flange 117 may be secured to the small cone 116 proximate the upper aperture of the small cone 116. A pipe 109, which may be an elongate, hollow member, may have a first end secured to a bottom portion of the small cone 116 proximate the lower aperture. In one embodiment, the pipe 109 may be welded to the small cone 116. In one embodiment, by way of example, and not as a limitation, the pipe 109 may be a schedule 80 steel pipe.

The motor may be connected to a feed screw 110 through a transmission. The transmission may include a motor controller, drive shaft 112, and ball bearing housing 134. The feed screw 110 may be positioned in the interior of the pipe 109. The feed screw 110 may be actuated by the motor or a gearbox, which may cause rotation of the feed screw 110, which movement may facilitate the feeding of the print media down the length of the pipe 109 from the hopper 106 to the nozzle 108. A drive shaft 112 may transmit torque to the feed screw 110. In one embodiment, the torque may be supplied to the drive shaft 112 by a motor. The motor may be controlled by a motor controller, which may provide velocity control in a closed loop to the rotation of the feed screw 110. The motor controller may also be configured to provide over current protection. The motor controller may control the torque provided by the motor to the feed screw 110 through the drive shaft 112. The motor controller may receive feedback data indicative of the speed of rotation of the feed screw 110 and may increase or decrease current to the motor in response to that feedback.

The drive shaft 112 of the transmission may have a first end connected to or driven by the motor, may extend through a pass-through hole in the center of a wrist joint of the robotic arm 200, continue into the hopper 106, and have a second end secured to the feed screw 110.

The feed screw 110 may secure to the drive shaft using female and male hex features on the drive shaft adapter and feed screw 110.

A ball bearing housing 134 may be secured to and carried by the hopper 106. By way of example, and not as a limitation, in one embodiment, the ball bearing housing 134 may be secured to the upper hopper plate 114 with a plurality of bolts or the like. The ball bearing housing 134 may be sealed to prevent the raw materials or other substances from entering the ball bearing housing 134 or otherwise contaminating ball bearings carried by the ball bearing housing 134. The ball bearing housing 134 may surround the drive shaft 112 to prevent the drive shaft 112 from causing unnecessary friction with the hopper 106. Angular contact ball bearings 135 may be pressed into the ball bearing housing 134 and adapted to contact the drive shaft 112. The angular contact ball bearings 135 may react to thrust and radial loading of the drive shaft 112.

The drive shaft 112 may include a flange 136, which may be welded to the bottom of the drive shaft 112. The flange 136 of the drive shaft 112 may secure to an agitator 120. In one embodiment, by way of example, and not as a limitation, the flange 136 of the drive shaft 112 may secure to a flange 139 of the agitator 120 using one or more bolts.

The agitator 120 may include one or more lateral members 137, one or more paddles 121, one or more upright members 138, and a flange 139. The agitator 120 may rotate with the drive shaft and break up or fluidize the bulk material at the bottom of the hopper 106. In one embodiment, the flange 139 of the agitator 120 may secure to one or more upright members 138. The one or more upright members 138 may secure at a first end to the flange 139 of the agitator 120, extend downwardly from the flange 139 toward the nozzle 108, and secure to a lateral member 137 at the second end. Each lateral member 137 may secure to an upright member 138 at a first end, extend outwardly, orthogonally from the upright member 138 toward the conical body of the hopper 106 and secure to a paddle 121 at the second end. In one embodiment, each lateral member 137 may secure to a different paddle 121. There may be the same number of paddles 121 and lateral members 137. In one embodiment, there may be two paddles 121. Each paddle 121 may be positioned parallel to an interior surface of the conical body 130 of the hopper 106.

Rotation of the drive shaft may cause rotation of the agitator 120 and feed screw 110. This may cause the raw material of the print media to flow into the flutes of the feed screw 110 and be conveyed down the barrel 107. The print media may reach the heated zone on the barrel 107, which may melt and mix the raw materials of the print media.

As the raw materials proceed down the barrel, they may enter a heated zone located along at least a portion of the barrel 107. The heated zone may be identified as an area of increased temperature along the barrel 107. The heated zone may be controlled by the heating system 103, which may include a heater 124, which may be resistive heating wires or the like, wrapped around at least a portion of the barrel 107, one or more thermocouples 125, insulation 126, and a heating controller 152.

The heater 124 may be in thermal communication with the barrel 107 to increase the temperature of the barrel 107 and melt the print media as it travels down the feed screw 110 along the length of the barrel 107 before being extruded through the opening 140 of the nozzle 108. In one embodiment, the heater 124 may be wrapped around or in thermal communication with a bottom portion of the barrel 107. In one embodiment, the heater 124 may be wrapped around or in thermal communication with approximately twelve inches of the barrel 107. In such an embodiment, the heater 124 may be resistive heating wires. One or more thermocouples 125 may be located along at least a portion of the length of the heated zone. The one or more thermocouples 125 may be in thermal communication with the barrel 107 or heater 124 and in electrical communication with a heating controller 152. The heating controller 152 may also be in electronic communication with the heater 124. The heating controller 152 may activate or deactivate the heater dependent upon an input signal received from the thermocouple 125. The heating controller 152 may activate the heater 124 until a desired temperature is detected by the thermocouple 125 at the barrel 107 or heater 124. When the desired temperature is achieved, the heating controller 152 may deactivate the heater 124 until a minimum temperature is detected by the thermocouple 125 at the barrel 107 or heater 124. The heating controller 152 may then activate the heater

124 again until the desired temperature is detected. By toggling on and off the heater 124, the heating controller 152 may maintain a set temperature along the heated zone of the barrel 107. The heated zone may be surrounded by an insulator 126 placed around the exterior of the barrel 107, one or more thermocouples 125, and heater 124. In one embodiment, the insulation 126 may be furnace batting insulation.

The temperature of the heated zone may be controlled by a heating controller 152. The heating controller 152 may receive feedback indicative of the temperature of the barrel 107, pipe 109, or raw material entering, in, or exiting the heating zone. The heating controller 152 may increase, decrease, or maintain the current or voltage provided to the heater 124 to achieve a desired temperature.

The pipe 109 may be temperature controlled by the heating system, which may create a heated zone along at least a portion of the pipe 109. The raw materials of the print media may be melted and mixed as they progress through the heated zone of the pipe 109 and towards the nozzle 108.

In one embodiment, a lower portion of the pipe 109 may include a mating portion 141. By way of example and not as a limitation, the mating portion 141 may be a threaded NPT male interface or the like. Again, by way of example and not as a limitation, the threaded NPT male interface may be one inch. The mating portion 141 of the pipe 109 may secure to a corresponding mating portion 142 of the nozzle 108.

The raw materials of the print media may be driven downward through the pipe 109 by the feed screw 110 and be deposited into a cavity 123 of the nozzle 108. The continuous flow of raw materials from the barrel 107 may fill up the cavity 123 and force the raw materials out of the nozzle 108 opening 140.

A nozzle 108 may secure to the barrel 107 and include a mating portion 142, a tube 150 defining a cavity 123, an opening 140, and a threaded bolt hole pattern 143. A mating portion 142 of the nozzle 108 may be located on an upper portion of the tube 150 and configured to secure to the mating portion 141 of the pipe 109 of the barrel 107. By way of example and not as a limitation, the mating portion 142 may be a threaded NPT female interface or the like. Again, by way of example and not as a limitation, the threaded NPT female interface may be one inch. The 3D print head mechanism 100 may be operated with and compatible with nozzles 108 having varying opening 140 diameters. In one embodiment, the nozzle 108 opening 140 diameter may range from ¼" to 15/16". The nozzle 108 may have an upper aperture defined by an open end of the tube 150. The upper aperture may form a passageway between the nozzle 108 and the barrel 107. The tube 150 may have an occluded end opposing the open end. The lower aperture, or opening 140, of the nozzle 108 located in the occluded end of the tube 150 may provide a passageway for the print media to exist the 3D print head mechanism 100.

The nozzle 108 may include a pipe cap 146. The pipe cap 146 may be located on the occluded end of the tube 150. The pipe cap 146 may occlude the occluded end of the tube 150. By way of example, and not as a limitation, the pipe cap 146 may be steel or the like. In one embodiment, the mating portion 142 may be located at an open end of a pipe cap 146 and the opening 140 may be formed in the occluded end of the tube 150 by creating a lower aperture in the pipe cap 146. By way of example and not as a limitation, the pipe cap 146 may be a 1" NPT steel pipe cap. The pipe cap may have an open end and an occluded end. The opening 140 may be a hole formed along the central axis of the occluded end of the pipe cap of the nozzle 108, the opening 140 may have an internal or external chamfer. In some embodiments, the opening 140 of the nozzle 108 may include both an internal and external chamfer.

The interior portion of the tube 150 between the open end and the occluded end and within the walls of the tube 150 may be the cavity 123 of the nozzle 108. Melted print media may enter the cavity 123 through the pipe 109 secured to the open end of the nozzle 108 and exit through the opening 140.

The nozzle 108 may include a plate 148 having a threaded bolt hole pattern 143 secured to an exterior of the lower portion of the nozzle 108 under the opening 140. The threaded bolt hole pattern 143 may be located on a plate 148, which is may be affixed to an external surface of the nozzle 108. The threaded bolt hole pattern 143 may interface with a corresponding bolt hole pattern 147 of the fume extraction system, which may be located on a bracket 118 of the fume extraction system. The bracket 118 of the fume extraction system may secure to the plate 148 of the nozzle 108 using the corresponding bolt hole patterns 147, 143. The bracket 118 of the fume extraction system may secure flexible tubes 144 or cooling fans 145 of the fume extraction system proximate and in fluid communication with the opening 140 of the nozzle 108. In one embodiment, the tubes 144 may have an open end secured to the plate 148. The tubes 144 may each have an inlet positioned proximate the opening 140 of the nozzle 108 to facilitate removal of gases associated with materials extruded from the nozzle 108. In embodiments with a plurality of tubes 144, each of the plurality of tubes 144 may have an open end secured to the plate 148. The gases may travel through the tubes 144 to an exhaust removed from the area in which an operator may be located. A manifold 128 may carry second open ends of each of the plurality of tubes 144 and a first open end of an exhaust tube 129. The second open ends of each of the plurality of tubes 144 may be in fluid communication with the first open end of the exhaust tube 129 at the manifold. The exhaust tube 129 may receive gas or fluid from each of the plurality of tubes 144 and exhaust the gas or fluid away from the area in which the 3D print head mechanism 100 is located. One or more cooling fans 145 may be positioned proximate an inlet to each tube 144 to encourage gas or fluid to enter the tube 144. The cooling fans 145 may be located within an inlet of the tube 144 and configured to draw air and gases from the raw material into the tube 144. The cooling fans 145 may be located proximate the opening 140 of the nozzle 108 to cool the print media after it is extruded.

The fume extraction system may be used to exhaust any fumes produced during the extrusion process to the outdoor environment for personnel safety reasons. The fume extraction system may include one or more tubes 144 attached near the nozzle 108 opening. The tubes 144 may be flexible air hoses or the like. The one or more tubes 144 may extend from the nozzle 108 opening 140 along the barrel 107 and the hopper 106 to a manifold 128. The manifold 128 may be configured to combine the airway of one or more tubes 144 into a single airway of an exhaust tube 129 having a diameter larger than the individual tubes 144. In one embodiment, there may be three two-inch tubes 144, which the manifold 128 combines into a single four-inch air hose 129. The air hose 129 may be routed away from the manifold 128 along the robotic arm 200 and then outside to an exhaust chimney. One or more duct boost fans 153 may be positioned within the tubes 144, 129 and may be used to draw air through the air tubes 144, 129 from the nozzle 108 opening 140 to the exhaust. A duct boost fan 153 may be secured to at least one of the tubes 144, 128 and in fluid communication with an interior volume of the same tube.

The dry air purge system may be used to eliminate moisture in the air inside the hopper 106. The dry air purge system may be used to prevent moisture absorption into the pellets when polyethylene terephthalate (PET) based pellets or other moisture sensitive materials are used as a component of the raw material. The dry air purge system may include a high efficiency particulate air (HEPA) filter 149 carried by the filter carrying aperture 131, which may be built into the hopper 106. Air may exhaust from the hopper 106 into the ambient environment through the HEPA filter 149. The HEPA filter 149 may be carried by the upper hopper plate 114. Cleaned and dried ambient air may be forced into the hopper 106 by the dry air purge system to provide a continuous supply of dry air at no greater than five psi. The ambient air may be regulated at a facility port. A fan may be configured proximate an inlet of the hopper 106 to provide the dry air to the interior of the hopper 106.

The 3D print head mechanism 100 may be adapted to utilize at least two types of print media for printing. In one embodiment, the primary raw material of the print media may be powdered black point-1 (BP-1) basalt regolith simulant mixed with high density polyethylene (HDPE). The HDPE may be in powder or pellet form. In another embodiment, the primary raw material may be pelletized basalt glass fibers mixed with polyethylene terephthalate glycol (PETG). Regolith is readily available on planetary surfaces and HDPE can be synthesized from resources in space (especially Mars) using the Fischer-Tropsch method or recycled from available mission materials such as packaging. PETG and basalt glass fiber pellets may have numerous advantages including excellent material properties and processing characteristics.

The robotic arm 200 used to position the 3D print head mechanism 100 may be a commercially available FANUC M-410iC/185 palletizing robot. This is an industrial robot designed for high volume production to palletize heavy products quickly and efficiently. The FANUC M-410iC/185 palletizing robot has four axes and a payload capacity of 185 Kg (407 lbs.). The three major axes (X, Y, and Z) can be moved at speeds up to 140°/s and the rotation axis at the wrist joint 201 can move at 305°/s. The maximum reach height of the robotic arm is 3143 mm (124 inches). The control system may be a Fanuc R-30iB A-Cabinet Controller with a graphic iPendant.

Software utilized to control the robotic arm 200 and attached 3D print head mechanism 100 may include the following functions: provide a GUI for all operation and configuration of the software tool; parse the g-code and extract G1 commands containing motion or extrusion into a toolpath array; allow the user to shift the extruded print media to the appropriate robot tool frame; place the extruded print media in any location in the robots workable area; complete a safety check to ensure that the print area does not exceed a defined work area; allow a user to configure the following parameters: X, Y, and Z center, print speed, movement speed between extrusions, termination type of motion, acceleration value, feed system motor speed, pause times when starting and stopping extrusion, and enable/disable extrusion control; provide an option to display a 3D plot of the compiled toolpath; generate appropriate analog output values and pause commands to control extrusion; compile the resulting program into a valid TP program; allow the user to save and load configurations for later use; display total print size and estimated print time; convert G-Code to proprietary teach pendant programs; extract all motion and extrusion information from G-Code; allow user to shift the coordinates to the desired robot tool frame; modify commands to include custom motion between extrusions for cleaner print results; and generate a 3D plot of the toolpath for verification.

In order to control extrusion speed and allow the starting and stopping of extrusion during the print, control hardware may be required. An adjustable analog voltage output may be connected to an analog input on the motor controller. The motor controller may be set to an analog velocity control mode, and the voltage range of the adjustable analog voltage output may be mapped to a corresponding motor speed. By changing the analog output value during each print program, the extrusion speed may be controlled.

Moisture absorbed by the raw materials of the print media, including, but not limited to, the BP-1/HDPE, basalt glass fiber/PETG, or like, may negatively affect the performance of the system. BP-1 is hygroscopic. Therefore, during the extrusion process, as the BP-1 heats up, the moisture may be liberated and flow to the cooler raw materials above the heated zone. The buildup of moisture in the hopper 106 may cause changes to the characteristics of the raw materials and make the print media more cohesive. This may tend to block the flow of raw materials down the feed screw 110, thereby leading to inconsistent extrusion rates.

The basalt glass fiber/PETG pelletized feed stock may readily absorb water, which may lead to steam pockets forming in the heated zone of the barrel 107. The steam pockets may lead to the extrusion rate becoming inconsistent. Additionally, PETG may hydrolyze when melted in the presence of moisture, which may yield a more brittle extrudate.

For these reasons, it may be important to reduce or eliminate excess moisture within the hopper 106. Thorough pre-drying of the raw materials and maintaining a dry environment in the hopper 106 while printing may be sufficient to eliminate issues with moisture in the raw materials.

It may be desirable to have a feed screw 110 with dual flight screws and thin flights to reduce friction experienced by the feed screw 110 and the related torque supplied by the feed screw motor.

Small changes in the temperature of the nozzle 108 may dramatically change the surface characteristics of the extrudate. Factors affecting the temperature of the nozzle 108, may include, but are not limited to, the heat zone temperature, extrusion rate, environmental temperature, air flow over the nozzle, insulation position, and extrudate buildup on the nozzle 108. The temperature variations may produce three typical conditions of the system. When the nozzle 108 is too cold, the raw material may freeze in the nozzle 108 and reduce the effective nozzle diameter. When the nozzle 108 is too hot, the extrudate may adhere to the nozzle 108 as it flows through, thereby creating a rough extrusion. When the nozzle 108 temperature is just right, the extrudate may flow with a smooth surface finish and consistent diameter. Therefore, in some embodiments, there may be a second closed loop controlled heating zone on the nozzle 108 to reduce or eliminate temperature fluctuations within the nozzle.

The raw materials may be in powder form or pelletized. Quality and consistency of extrusions from compounded pellets may be better than mixed powders.

Important factors to consider when selecting an appropriate robotic arm 200 may include, but are not limited to, increased degrees of freedom for more advanced additive construction techniques, a robust API, communications options for driving the robot, and low-level access to robot functionality. Additionally, direct control or editing of tool paths may be beneficial.

The quality of print results may be improved by fine tuning factors, including, but not limited to, temperatures, extrusion speeds, print speeds, and material selection and composition.

A polymer concrete material may be used as raw material, or print media, for three-dimensional automated additive construction. The polymer concrete material may include granular material and thermoplastics for use in construction and fabrication applications. The polymer concrete material is comparable to Portland cement concrete in compression strength and up to 6× stronger in bend strength.

The polymer concrete material may be suitable for several fabrication methods including injection molding, pouring slabs, machining, 3D printing, and additive construction. The polymer concrete material may have several unique qualities. One such quality may be that structures constructed from the polymer concrete material may be bound to one another or repaired using heat. By way of example, and not as a limitation, bricks constructed from polymer concrete material may be bound together using heat. Additionally, and again by way of example and not as a limitation, heat may be used to repair structural defects including, but not limited to, cracks. The polymer concrete material may be reheated, which may allow the defective area to be smoothed over. Additionally, the polymer concrete material is substantially impermeable to water and can be made using recycled plastics.

The polymer concrete material may provide the capability to complete construction and fabrication projects on the Moon and/or Mars using local resources. This may reduce required launch mass because at least a portion of construction materials will not need to be transported from Earth. The polymers used in the polymer concrete material may be recycled and/or produced from other material used on the Moon or Mars. Additionally, the granular materials used in the polymer concrete material may be available on the Moon and Mars.

In addition to uses on Mars or the Moon, the polymer concrete material is a versatile material that could be used in many other applications including, but not limited to, civil structures, structural parts, including, but not limited to, wheels or beams, or the like.

The use of polymer concrete material provides a beneficial advantage to off Earth and remote on Earth construction projects because it may be used with local granular material, or dirt, and recycled plastics. This may reduce logistics required to complete construction projects.

Structures constructed from the polymer concrete material may be post processed by sintering, which removes the polymers from the structure and sinters the granular material together to form a sintered rock structure.

The polymer concrete material may be thermoplastic and may have commercial applications wherever concrete is used, especially in remote areas where normal Portland cement concrete ingredients may not be available. Additionally, the polymer concrete material has potential commercial applications where its beneficial properties, including, but not limited to, simple binding and repair using heat or water impermeability are desirable. Because the polymer concrete material may be produced using local granular materials and plastics in the recycle stream, it has the potential to be less costly than other concrete varieties.

The polymer concrete material may include or comprise basalt and plastic. The basalt may be loose fine basalt powder, such as volcanic ash. The plastic may be ground high-density polyethylene (HDPE). Both the basalt and plastic may be commercially available. The basalt may be mixed with the plastic to create the polymer concrete material. The basalt and plastic may be mixed inside a material delivery hopper 106 using an agitator 120 paddle 121. The mixture of basalt and plastic may be moved down a barrel 107 using an feed screw 110.

In another embodiment, the basalt and plastic may be formed into pellets. Each pellet may be comprised of basalt and plastic. By mass, each pellet may be, for example, between 60% and 90% basalt with the balance percentage as plastic, i.e., between 40% and 10% plastic. Each pellet, however, may be preferably 85% basalt and 15% plastic by mass. The basalt and plastic may be combined as a single consolidated and thoroughly mixed pellet. In one embodiment, each pellet may be ⅜" long, and 3/16" in diameter. The pellets may be fed into a 3D printing system via a commercially available pellet conveying system, which may be referred to as a feeder. The feeder may continuously keep the pellet hopper 106 full. The pellet hopper 106 may provide the pellets to a nozzle 108. The pellets may enter the nozzle 108 from the hopper 106 by traveling down a barrel 107 housing a feed screw 110. The outside of the barrel 107 may be heated using heaters 124 tied to a control system. The heaters 124 may heat the pellets above the melting temperature of the plastic, which may be 150° C. After passing through the barrel 107, the polymer concrete material may be extruded by a nozzle 108 as a very thick liquid. The polymer concrete material extruded by the nozzle 108 may form a layer on a flat plate. The layer may be ¼" tall and formed in the shape in which the nozzle 108 places the polymer concrete material. The nozzle 108 may be raised off the flat plate an additional ¼" each time it prints on top of the previous layer. In this way, the next layer is deposited directly on top of the previous layer. This process may be repeated until the desired completed part height is achieved. The nozzle 108 may pre-heat the previous pass to near the plastic melting temperature just in front of the print head stream of the next layer, which may facilitate bonding between the two layers.

The print media may be formed into a pellet to be used as the medium with which the 3D printer prints. A pellet may include a Portland cement (PC) or other polymer concrete, rock, sand, and thermoplastic polymer binders formed into a pellet, which may be extruded by the 3D print head mechanism 100.

The PC concrete, rock, sand, and thermoplastic polymer composition may be formed into 3 mm length pellets. The composition may form pellets by using a thermoplastic polymer binder, which may, more specifically, be an anhydrous thermoplastic polymer binder with glass fiber reinforcements. The pellets may be 3D printed by extruding these pellets out of a heated nozzle 108 of a 3D print head mechanism 100. In one embodiment, the desired structure may be achieved by placement of the pellets by a 3D printer, which may not heat the pellets prior to extrusion. In such an embodiment, the structure may be saturated with sprayed water after the pellets are placed. The water may activate the PC chemical reaction and harden the PC into PC concrete.

Using pellets with an anhydrous thermoplastic binder and glass fiber reinforcements provides a superior method for 3D printing PC when compared to a method of 3D printing using PC slurry concrete. While Portland cement slurry concrete 3D printing is possible, it is very messy and hard to control. Labor costs and complexity of design can be reduced when the pelletized concrete printing method is employed. Additionally, use of the pellets is more practical for robotic automation of the PC 3D printing process. Pelletized printing is advantageously clean and precise. Water is added as a post curing step in order to harden the concrete into its final state, thereby providing a cleaner printing process.

Additionally, complex shapes can be formed with a non-heated 3D print head using the pellets, which are not possible with traditional concrete form work or brick laying. Use of the pellets also allows automation and precise 3D printing of Portland cement concrete, which is not possible using a slurry. An additional benefit to the use of pellets compared to a slurry is less material is needed as pellet designs can use advantageously optimized hollow structures, which are not possible with slurry.

The pellet may provide particular benefits when used to create large 3D printed structures. The pellets may include sand, rock, and a polymer binder in addition to the PC concrete. All of the elements in the mixture may be formed into a pellet and extruded by a 3D printer as the printing medium. The pelletization of the sand, rock, and cement may increase the versatility of the concrete. The sand, gravel, and cement may be ground into a powder form along with the polymer binder, mixed homogenously, and formed into a pellet.

The concrete may be Portland cement concrete or another similar type of concrete. The rock may be a crushed rock aggregate. The sand may be a general purpose sand. The polymer binder may be an anhydrous thermoplastic polymer binder with glass fiber reinforcements. Generally, it may be desirable to use as little of the polymer binder as possible in the mixture. The mixture may, for example, have a 3:2:1 ratio of gravel, sand, and cement with additional polymer binder mixed in as small an amount as necessary to pelletize the gravel, sand, and cement. In one embodiment, 25% of the entire mix may be a polymer binder. In such an embodiment, the mixture may have a 3:2:1:2 ratio of gravel, sand, cement, and polymer binder. Each of the four ingredients may be finely ground to a find ground powder. The mixture may then be pelletized into pellets of 3 mm or less length.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A three-dimensional print head apparatus comprising:
a securing mechanism adapted to secure to a wrist joint of a robotic arm;
a hopper secured to the securing mechanism and having a cavity and a lower aperture, a conical body having an upper aperture with a diameter greater than a diameter of the lower aperture, wherein the conical body tapers from the upper aperture to the lower aperture, and an upper hopper plate configured to carry the securing mechanism, wherein the upper hopper plate secures to and occludes the upper aperture of the conical body;
a nozzle having an upper aperture and a lower aperture;
a barrel having an elongate, hollow member with a first end secured to the lower aperture of the hopper and a second end secured to the upper aperture of the nozzle;
a heating system positioned along the barrel;
the upper hopper plate comprising a filter carrying aperture formed through a thickness of the upper hopper plate and adapted to carry an air filter, and a sealable aperture formed through a thickness of the upper hopper plate and adapted to be in a sealed or an unsealed configuration.

2. The apparatus of claim 1 wherein the heating system comprises:
a heater in thermal communication with the barrel;
a thermocouple in thermal communication with the barrel;
an insulator located on an external side of the barrel; and
a heating controller in electronic communication with the heater and the thermocouple, wherein the heating controller activates the heater dependent upon an input signal received from the thermocouple.

3. The apparatus of claim 1 wherein the barrel further comprises:
a small cone having a sidewall, an upper aperture, and a lower aperture, wherein the upper aperture has a diameter greater than a diameter of the lower aperture and wherein the sidewall tapers from the upper aperture to the lower aperture;
an upper flange secured to the small cone proximate the upper aperture of the small cone;
a pipe having a first end and an opposing second end secured proximate the lower aperture of the small cone; and wherein the hopper further comprises:
a lower flange secured proximate the lower aperture of the hopper and configured to secure to the upper flange of the barrel.

4. The apparatus of claim 1 further comprising:
a feed screw positioned in an interior of the elongate, hollow member of the barrel; and
a drive shaft adapted to transmit torque to the feed screw.

5. The apparatus of claim 4 further comprising a motor adapted to provide torque to the drive shaft.

6. The apparatus of claim 5 further comprising:
a motor controller adapted to control the torque provided by the motor; and
a ball bearing housing carried by the hopper and surrounding the drive shaft.

7. The apparatus of claim 6 further comprising an angular contact ball bearing carried by the ball bearing housing and in contact with the drive shaft.

8. The apparatus of claim 4 further comprising an agitator secured to the drive shaft.

9. The apparatus of claim 8 wherein the agitator further comprises:
an agitator flange secured to a flange of the drive shaft;
an upright member secured at a first end to the agitator flange and extending from the agitator flange toward the nozzle;
a lateral member having a first end secured to a second end of the upright member and extending orthogonally from the upright member toward the conical body of the hopper; and
a paddle secured to a second end of the lateral member and positioned parallel to an interior surface of the conical body of the hopper.

10. The apparatus of claim 1 wherein the nozzle comprises:
a tube defining a cavity and having an open end, defining the upper aperture of the nozzle, and an occluded end, wherein the lower aperture of the nozzle is located in the occluded end of the tube.

11. The apparatus of claim 10 wherein the nozzle comprises:
a threaded portion located proximate the open end of the tube and adapted to secure to the second end of the barrel.

12. The apparatus of claim 1 further comprising:
a plate secured to the nozzle; and
a single flexible tube having an open end secured to the plate.

13. The apparatus of claim 1 having a fume extraction system comprising:
a plate secured to the nozzle
a plurality of tubes, wherein each of the plurality of tubes has a first open end secured to the plate,
a manifold carrying a second open end of each of the plurality of tubes, and
an exhaust tube having a first open end secured to the manifold and in fluid communication with the second open ends of each of the plurality of tubes.

14. The apparatus of claim 13 wherein the fume extraction system further comprises:
a bracket adapted to secure to the plate and carry each of the first open ends of the plurality of tubes;
a cooling fan secured to the plate and in fluid communication with the lower aperture of the nozzle;
a duct boost fan secured to at least one of the plurality of tubes and in fluid communication with an interior volume of at least one of the plurality of tubes; and
a bolt hole pattern positioned on the bracket to align with a second bolt hole pattern positioned on the plate.

15. The apparatus of claim 1 further comprising:
the robotic arm; and
the wrist joint cooperatively configured to position the lower aperture of the nozzle with two degrees of freedom.

16. The apparatus of claim 15 wherein the robotic arm and the wrist joint are cooperatively configured to position the lower aperture of the nozzle with three degrees of freedom.

17. A three-dimensional print head apparatus comprising:
a securing mechanism adapted to secure to a wrist joint of a robotic arm;
a hopper secured to the securing mechanism and having a cavity and a lower aperture, wherein the hopper comprises:
an upper hopper plate configured to carry the securing mechanism and having an air filter aperture formed through a thickness of the upper hopper plate adapted to carry an air filter and a sealable aperture formed through the thickness of the upper hopper plate and adapted to be in a sealed or an unsealed configuration, and
a conical body having an upper aperture with a diameter greater than a diameter of the lower aperture, wherein the conical body tapers from the upper aperture to the lower aperture, and
wherein the upper hopper plate occludes the upper aperture of the conical body;
a nozzle having an upper aperture and a lower aperture wherein the nozzle comprises:
a tube defining a cavity and having an open end defining the upper aperture and an occluded end, wherein the lower aperture of the nozzle is located in the occluded end of the tube;
a barrel comprising:
a small cone having a sidewall, an upper aperture, and a lower aperture, wherein a diameter of the upper aperture is greater than a diameter of the lower aperture and the sidewall tapers from the upper aperture to the lower aperture;
a pipe having a first end and an opposing second end secured proximate the lower aperture of the small cone, wherein the first end secures to the upper aperture of the nozzle,
a feed screw positioned in an interior of the pipe,
a drive shaft adapted to transmit torque to the feed screw,
a motor adapted to provide torque to the drive shaft,
a motor controller adapted to control the torque provided by the motor, and
an agitator secured to the drive shaft, and
wherein the upper aperture of the small cone secures to the lower aperture of the hopper;
a heating system positioned along the barrel and comprising:
a heating device in thermal communication with the barrel,
a thermocouple in thermal communication with the barrel, and
a heating controller in electronic communication with the heating device and the thermocouple, wherein the heating controller activates the heating device dependent upon an input signal received from the thermocouple; and
a fume extraction system comprising:
a tube having a first open end secured proximate the lower aperture of the nozzle,
a cooling fan in fluid communication with the lower aperture of the nozzle, and
a duct boost fan in fluid communication with an interior volume of the tube.

* * * * *